United States Patent Office 3,499,731
Patented Mar. 10, 1970

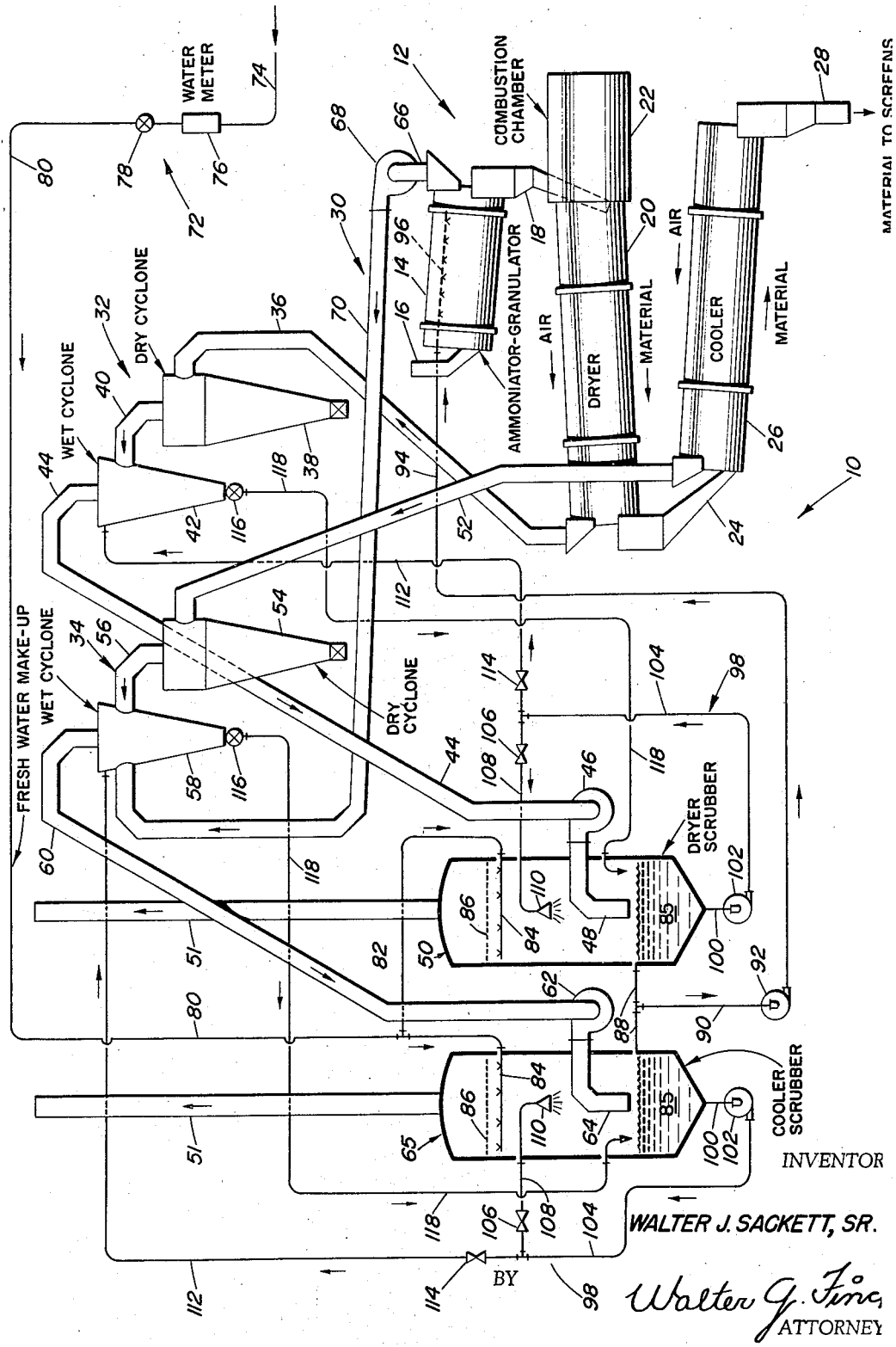

3,499,731
HIGH EFFICIENCY DISCHARGE CONTROL SYSTEM FOR A CHEMICAL PROCESSING PLANT
Walter J. Sackett, Sr., 3700 Echodale Ave., Baltimore, Md. 21206
Filed Feb. 16, 1967, Ser. No. 616,511
Int. Cl. B01j 2/00; B04c 9/00; B01d 47/00
U.S. Cl. 23—259.1
3 Claims

ABSTRACT OF THE DISCLOSURE

A fully implemented control system for preventing the discharge of obnoxious wastes from plants such as those of the ammonium phosphate fertilizer types. The problem that the wastes are of different vapors and dusts in differing combinations is solved by the use of regenerating combinations of dry and wet cyclones and scrubbers taking into account that certain effluents are at elevated temperature.

This invention relates generally to separation of substances from exhaust vapors in certain chemical processing plants, and more particularly it pertains to a high efficiency control system for a chemical fertilizer plant with anti-pollution features.

With the present day emphasis on lowering the pollution of our environment, it is no longer permissible to freely discharge polluted vapors and liquids resulting from certain chemical reactions and material treatments.

Often there are all three states of waste material present, namely, solid, liquid, and gas. This is especially true in the case of ammonium-phosphate-potassium fertilizer plants which use continuous processing.

Accordingly, the principal object of this invention is to provide a high efficiency air and stream pollution control system for a chemical processing plant.

Also, it is an object of this invention to provide a treatment arrangement for the retrieval of otherwise lost process chemicals and to thus improve the efficiency of a fertilizer plant.

Another object of this invention is to provide a treatment process for removing the pollution elements from exhaust air and to prevent the discharge of polluted water externally in the manufacture of fertilizers in a chemical fertilizer plant.

Still another object of this invention is to provide an air-water pollution control system for a chemical plant whereby the exhaust air may be discharged to the atmosphere with reduced height stacks and as clean air without any pollution thereof.

Another object of this invention is to provide a pollution control system for a chemical fertilizer processing plant wherein the amount of makeup water used in the system is minimized through the recovery and reuse of the polluted water in the chemical manufacturing system, and thus without discharging of the polluted water outside of the plant into adjacent streams.

Still another object of this invention is to provide a pollution control system for a fertilizer processing plant which eliminates the polluted air discharged to the atmosphere and which simultaneously controls the reuse of polluted water in the chemical fertilizer system so that it is not discharged externally of the chemical plant to pollute adjacent streams.

Other objects and attendant advantages of this invention will become more readily apparent and understood from the following detailed specification and the accompanying single schematic drawing of an ammonium-phosphate-potassium plant.

In the drawing, reference numeral 10 indicates generally an ammonium-phosphate-potassium processing plant of improved design. This plant 10 includes an ammoniator-granulator system 12 of the type well known in the art and consisting of a rotating ammoniator-granulator 14, a rotating dryer 20 and a rotating cooler 26.

The previously blended solid portion of the material formula introduced by delivery chute 16 to the rotating ammoniator-granulator 14 is reactively treated with ammonia, sulphuric and/or phosphoric acids, steam and water. A chute 18 conveys the resulting hot plasticized mass into the dryer 20. Here lifting flights shower the material thus introduced through the hot bases from the combustion chamber 22, thus drying the material as it progresses to the discharge end.

At the end of the dryer 20, a chute 24 discharges the material into the cooler 26 where through a showering action it is exposed to an oppositely directed air stream and delivered through chute 28 to classifying screens thence to the product storage area of the plant.

It should be understood the foregoing process results in wastes of three different overlapping classes which in the past were openly disposed of or only partially treated. These classes are (a) ammonia, water vapor, acid fumes and finely divided ammonium and potassium chloride particles from the ammoniator-granulator 14, (b) ammonia and combustion dust products from the dryer 20 and (c) ammonia and product dust from the cooler 26. The corresponding retrieval systems are indicated in the drawing by reference numerals 30, 32, and 34 respectively.

System 30 requires that the duct 66 which exhausts the ammoniator-granulator 14 be provided with an exhaust fan 68 to feed the duct 70. System 32 requires that the duct 36 which exhausts the combustion gases from the dryer 20 be provided with an exhaust fan 46 to feed the duct 44. System 34 requires that the duct 52 which exhausts the air from the cooler 26 be provided with an exhaust fan 62 to feed the duct 60.

The two systems 32 and 34 which handle dust, as related, each include first a dry cyclone 38 and 54, respectively. Here "fines" are collected for ultimate recycling in the manufacturing process for example, as disclosed in my U.S. Patent 3,272,596, entitled "Apparatus for Manufacturing Fertilizer" issued Sept. 13, 1966.

The outlet ducts 40 and 56 from the cyclones 38 and 54, respectively, carry ammonia gas as well as some vapor-borne residual dust to associated wet cyclones 42 and 58. Ammonia gas is taken up as hydroxide by the water sprays therein and the particulate dust is taken up in liquid suspension and drawn off as a hydroxide-charged slurry through vane feeders 116 as will be related.

Wet vapors emerging from the wet cyclones 42 and 58 are transferred by ducts 44 and 60. The flow is aided by the aforementioned exhaust fans 46 and 62 in the respective lines leading to ducts 48 and 64. These ducts 48 and 64 are downwardly directed at their ends, the former within a dryer scrubber 50 and the latter within a cooler scrubber 65.

The scrubbers 50 and 65 are identical each consisting of a vertical tank with spray heads 84 and 110. Each further has a demisting bed 86 such as fibre glass filters or the like in the top and a discharge stack 51 thereabove to the atmosphere, for discharging the air from the scrubbers 50 and 65 as clean air after being treated in the systems.

A system 72 comprising an input line 74, a water meter 76, a valve 78, and lines 80 and 82 introduces fresh water to the scrubbers 50 and 65 through their spray head manifolds 84. The water wets the beds 86 above and the surplus collects in a pool 85 at the bottom. These pools 85 are also augmented by the recirculating scrubbing liquids through the return lines 118 of the vane feeders 116 previously mentioned.

The wet vapors from discharge ducts 48 (and 64) impinge on the surface of the pool and rise within the scrubber. Any remaining dust, water or air suspended, is driven forcefully into the pool 85.

A pump 102 in the line 100 withdraws the recirculating scrubbing waters from pool 85 recirculating it through a system 98 comprising a line 104, a valve 106, and a line 108 to the discharge head 110. The liquid spraying therefrom scrubs the rising wet vapors.

A valve 114 leading to branch line 112 taps the recirculating system 98 for liquid supply to the wet cyclones 42 and 58.

Overflow pipes 88 and a line 90 lead from the pool 85 to a pump 92 which removes excess slurry collected in the scrubbers 50 and 65 and transfers it over a line 94 to the ammoniator-granulator 14 to be introduced therein from a serrated launder 96. The chemicals contained in the overflow liquids are in this manner reintroduced into the process.

Where the proportion of air borne dust component is low and the dust is mainly vapor wetted particles as in the case of the ammoniator-granulator 14, the dry cyclone is by-passed, the vapor being carried by duct 70 directly to wet cyclone 58.

Obviously many modifications and variations of the present invention are possible in light of the above teachings. It is, therefore, to be understood that within the scope of the appended claims the invention may be practiced otherwise than as specifically described.

What is claimed is:

1. A high efficiency discharge control system for a chemical processing fertilizer plant having serially operative apparatus including ammoniator-granulator means emitting water soluble fumes, vapors and particles, dryer means emitting combustion dust and water soluble fumes, and cooler means emitting product dust and water soluble fumes, comprising: means to form a slurry of all said emissions, including first serially operative dry cyclone, wet cyclone and scrubber means adapted to receive and process said dryer emissions; second serially operative dry cyclone, wet cyclone and scrubber means adapted to receive and process said cooler emissions; means adapting said second wet cyclone means to receive said ammoniator-granulator means emissions, and means for recirculating said slurry from the respective scrubbers to said first and second wet cyclone means respectively.

2. A high efficiency air and stream pollution control system as recited in claim 1, wherein said plant is for processing ammonium-phosphate-potassium fertilizer.

3. A high efficiency air and stream pollution control system as recited in claim 2, and means for reusing said slurry in its entirety in said ammonium-granulator system including means for introducing slurry from said scrubbers to the ammoniator-granulator.

References Cited
UNITED STATES PATENTS

| | | | |
|---|---|---|---|
| 1,965,866 | 7/1934 | Tolman | 55—212 |
| 2,050,796 | 8/1936 | Kerschbaum et al. | |
| 2,062,091 | 11/1936 | Gooch | 23—262 XR |
| 2,680,680 | 6/1954 | Coleman | 71—39 XR |

JAMES H. TAYMAN, Jr., Primary Examiner

U.S. Cl. X.R.

23—2, 3, 105, 107, 259, 262, 284; 55—122, 237, 315, 342, 343, 349; 71—41; 261—111